Dec. 1, 1970 R. D. RIEDLE 3,543,602

LEVER POSITIONING APPARATUS

Filed Nov. 25, 1968

INVENTOR
ROBERT D. RIEDLE

BY
Woodard, Weikart, Emhardt & Naughton
ATTORNEYS

United States Patent Office 3,543,602

Patented Dec. 1, 1970

3,543,602
LEVER POSITIONING APPARATUS

Robert D. Riedle, Indianapolis, Ind.
(3868 New Salem Ave., Okemos, Mich. 48864)

Filed Nov. 25, 1968, Ser. No. 778,618
Int. Cl. G05g *5/00*
U.S. Cl. 74—526 7 Claims

ABSTRACT OF THE DISCLOSURE

A bracket affixed to a tractor frame adjacent a hydraulic valve control lever, mounts two semi-circular leaf springs, each having a distal end engaging an edge of the lever and both resisting movement of the lever from a central, neutral position, the valve control lever being returnable to neutral position by whichever of the springs is moved by the lever during operation thereof for actuation of the valve.

BACKGROUND OF THE INVENTION

Field of the invention

This invention relates generally to agricultural machinery, and more particularly to centering means for control levers thereon.

Description of the prior art

One example of prior art is illustracted in FIGS. 1 and 2 of this application. In that example a control lever 11 for a hydraulic valve is mounted on a pivot shaft 12. The lever is illustrated in neutral position but is operable about the pivot shaft between a position designated by dotted line 13 and dotted line 14 for various valve functions.

A generally flat spiral spring 16 is centered on the pivot shaft axis and has one end hook 17 disposed in front of a screw stud 18, and another end hook 19 disposed behind the screw stud 18. The valve lever 11 has an ear 21 extending inwardly therefrom parallel to the shaft axis 22 and between the two spring hooks.

If the valve lever is moved to the dotted line 13, the ear 21 thereon engages the hook 19 winding the spring as the lever is turned in a counter-clockwise direction. Similarly, if the lever is moved to the position of the dotted line 14, the other hook 17 is engaged and that portion of the spring is wound in the clockwise direction as the hook 19 engages the screw stud 18 to prevent the whole spring from rotating around the shaft axis. In either event, the spring unwinds to return the lever to the neutral position once the operator's hand is removed from the lever.

The problem with this prior art construction is the fact that a spring of this type is subject to eventual failure. Although the spring itself is not a very expensive item, the matter of removing it and replacing it involves a great deal of expense because it is necessary to get into the internal mechanism of the tractor associated with the shaft 12 in order to remove the shaft for replacement of the spring. Although it is possible to redesign the equipment so that the lever is somehow removed or removable from the shaft without removing the shaft from the tractor 23, many existing installations cannot be modified in this way and the present invention is directed toward solving the problem in another manner.

SUMMARY OF THE INVENTION

Described briefly, in a typical embodiment of the present invention, a bracket is mounted to the tractor adjacent the valve control lever shaft and has spring leaves on opposite sides of the lever, these leaves normally retaining the lever in the neutral position and operable, upon manual movement of the lever away from neutral position, to resist such movement and return the lever to neutral when the manual force has been removed. The spring leaves are mounted so as to be readily replaceable at minimal cost in the event of breakage, and also to avoid movement of the lever out of the neutral position upon breakage of a spring.

BRIEF DESCRIPTION OF THE DRAWING

The full nature of the invention will be understood from the accompanying drawing and the following description and claims.

DESCRIPTION OF THE PREFERRED EMBODIMENT

Figure 1:
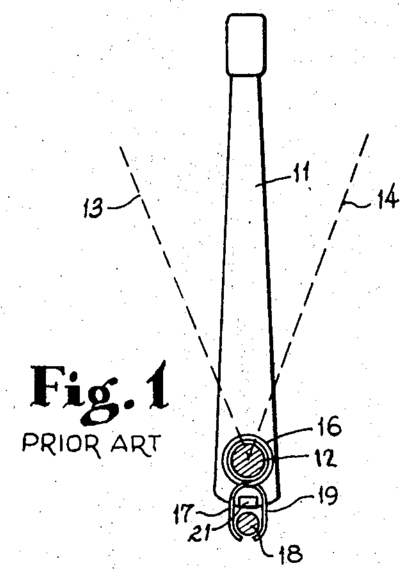
FIG. 1 is a side elevational view of a typical embodiment of the prior art, viewed from the inside outwardly along a lever shaft in the direction of arrows 1—1 in FIG. 2.
Figure 2:
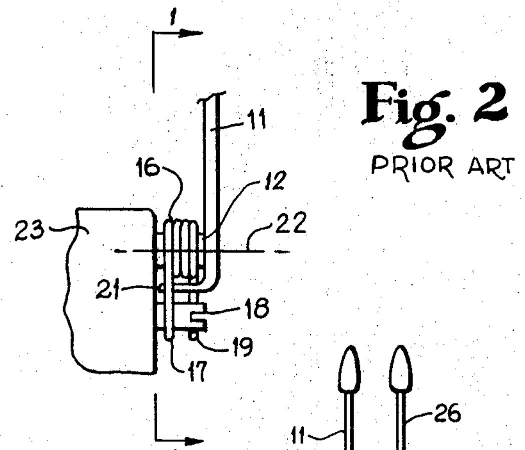
FIG. 2 is a rear elevational view of the typical embodiment of prior art.
Figure 4:
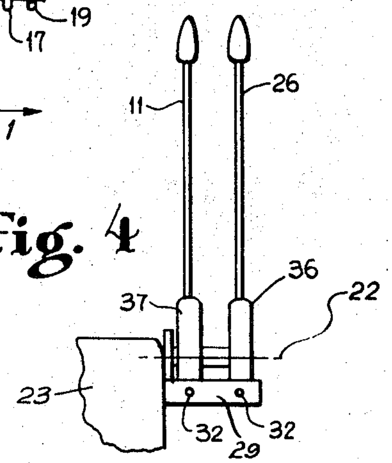
FIG. 4 is a rear elevational view thereof.
Figure 3:
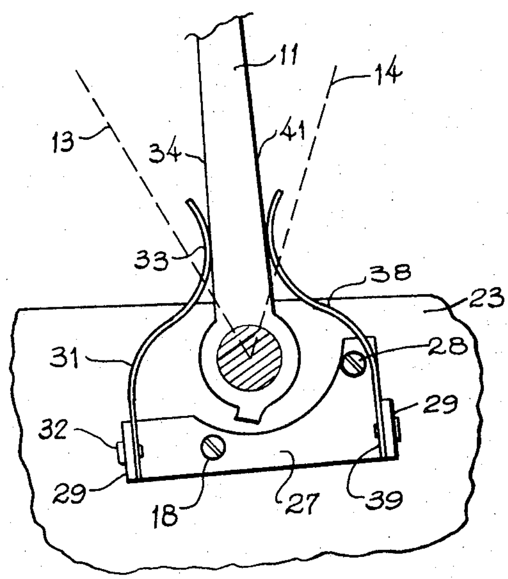
FIG. 3 is a side elevational view of a typical embodiment of the present invention, but omitting one of the levers, to facilitate the description.
Figure 5:
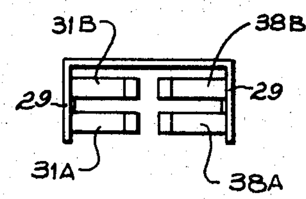
FIG. 5 is a top plan view thereof.

Referring to the drawings in detail, the prior art apparatus has been described hereinabove. According to the present invention, which is shown incorporated with a pair of valve control levers, lever 11 is shown in FIG. 3 much as it was in FIGS. 1 and 2, but looking from the outside in, instead of inside out as in FIG. 1. It is mounted to the tractor frame 23 for pivoting on the horizontal axis 22 between positions indicated by the dotted lines 13 and 14. It is shown in the central position which is a neutral position. The lever 26 (omitted from FIG. 3 to facilitate the illustration) is of virtually identical construction to 11, but mounted on a shaft coaxial with shaft 12 so that it is pivotable on a horizontal axis 22 and between positions such as 13 and 14. However the spiral spring shown in the prior art drawings is omitted and according to the present invention a bracket 27 is affixed to the tractor frame 23 by the screw stud 18 and screw 28 or a nut which may be threadedly received on a stud mounted in the tractor frame. Other fasteners might also be used, but the advantage of this arrangement is the fact that the bracket can be readily removed, if desired.

The bracket 27 has a pair of arms 29 projecting outwardly therefrom parallel to the shaft axis 22. On the rear arm 29, a leaf spring unit 31 is mounted by a pair of rivets 32. The leaf spring member has a pair of upstanding leaves integral with the base portion thereof and semi-circular in shape as indicated in FIG. 3 throughout a portion thereof, but actually of somewhat an S-shape, with the distal portions thereof at 33 engaging the rear marginal edges 34 of the levers 11 and 26. The leaf portion 36 engages the edge of lever 26, whereas the leaf portion 37 engages the lever 11.

Just as with the spring unit 31, a spring unit 38 has a lower portion thereof 39 affixed to the front bracket arm 29 by a pair of rivets, with two S-shaped spring fingers projecting upwardly from the mounting portion 39. Each of these spring fingers engages a front edge 41 of a valve lever.

It is to be noted that the point of engagement of the distal end of each of the spring fingers on the valve control lever is at a radius from the pivot axis of the lever such that when the lever is moved out of the neutral position, the resistance generated in the spring finger by deformation thereof by the lever provides a return moment on the lever urging it toward the neutral position. Therefore, although the spring fingers are slidable along the edges of the lever to a limited extent to accommodate the difference in location of the pivot points between the lever axis and the spring mounting points, nevertheless they are in an abutting relationship to the lever to establish the return torque.

As shown in the drawings, particularly FIG. 3, each of the spring fingers does touch the edge of the lever when the lever is in neutral position. However, at this point, virtually all of the stored potential energy of deformation in the springs has been dissipated so that in the event that the spring finger 31B, for example, would happen to break, the fingers 38B, would not push the lever out of the neutral position. Accordingly, the springs are arranged so that, although they will serve to return the lever to neutral position from some valve actuating position toward either the dotted line 13 or dotted line 14, the finger will not return the lever past the neutral position.

In addition to the feature of the present invention whereby the levers will be returned to neutral, and will not be urged past neutral in the event of spring breakage, the convenient mounting of the springs to the bracket by the rivets, and of the bracket to the tractor frame by the removable threaded fasteners 18 and 28, facilitates replacement of an inexpensive spring unit with a minimum of labor and minimal expense. Accordingly the present invention represents a significant and substantial improvement over the prior art described above.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. Lever positioning apparatus comprising:

a support base;

a shaft extending from said base;

lever means mounted on said shaft and pivotable on said base around the longitudinal axis of said shaft, said lever means being pivotable between first and second angular positions, and having a neutral position between said first and second angular positions;

first and second resilient members having mounting portions in fixed position with respect to said base, and contact portions engaging said lever means at points spaced from said axis, said resilient members resisting pivotal action of said lever means away from neutral position, said lever means including first and second levers in side by side relationship, said first resilient member having first and second spring fingers projecting from said mounting portion thereof and abuttingly engaging said first and second levers, respectively.

2. The apparatus of claim 1 wherein:

said second resilient member has first and second spring fingers projecting from said mounting portion thereof and abuttingly engaging said first and second levers, respectively, said pivotal axis being disposed between the first and second resilient members.

3. The apparatus of claim 2 wherein:

said contact portions are distal end portions of said fingers slidable along edges of said levers on which they abut.

4. Lever positioning apparatus comprising:

a support base;

a shaft extending from said base;

lever means mounted on said shaft and pivotable on said base around the longitudinal axis of said shaft, said lever means being pivotable between first and second angular positions, and having a neutral position between said first and second angular positions;

first and second resilient members having mounting portions in fixed position with respect to said base, and contact portions engaging said lever means at points spaced from said axis, said resilient members resisting pivotal action of said lever means away from neutral position;

removable fastener means securing said mounting portions to said support base;

a mounting bracket;

fasteners affixing said mounting bracket to said support base, said bracket having a pair of arms projecting from said support base in a direction generally parallel to said axis, said mounting portion of said first resilient member being affixed to one of said arms by said removable fastener means, and said mounting portion of said second resilient member being affixed to the other of said arms by said removable fastener means.

5. The apparatus of claim 4 wherein:

said mounting bracket fasteners are threadedly received in said base.

6. Lever positioning apparatus comprising:

a bracket having a portion mountable to a support base;

a pair of generally parallel arms projecting outward from said support base;

a pair of springs, one of said springs having one end mounted to one of said arms, and the other spring having one end mounted to the other of said arms, each spring having a finger projecting from its respective mounting arm to a distal end portion of the spring facing and spaced from a distal end portion of the other spring.

7. The apparatus of claim 6 wherein:

said spring fingers are generally S-shaped.

References Cited

UNITED STATES PATENTS

| | | | |
|---|---|---|---|
| 2,474,945 | 7/1949 | Johnson | 74—470 |
| 2,672,765 | 3/1954 | MacDonald | 74—565 |
| 3,208,299 | 9/1965 | Leonard et al. | 74—491 |
| 3,382,733 | 5/1968 | Miller et al. | 74—543 |

FRED C. MATTERN, Jr., Primary Examiner

F. D. SHOEMAKER, Assistant Examiner